UNITED STATES PATENT OFFICE.

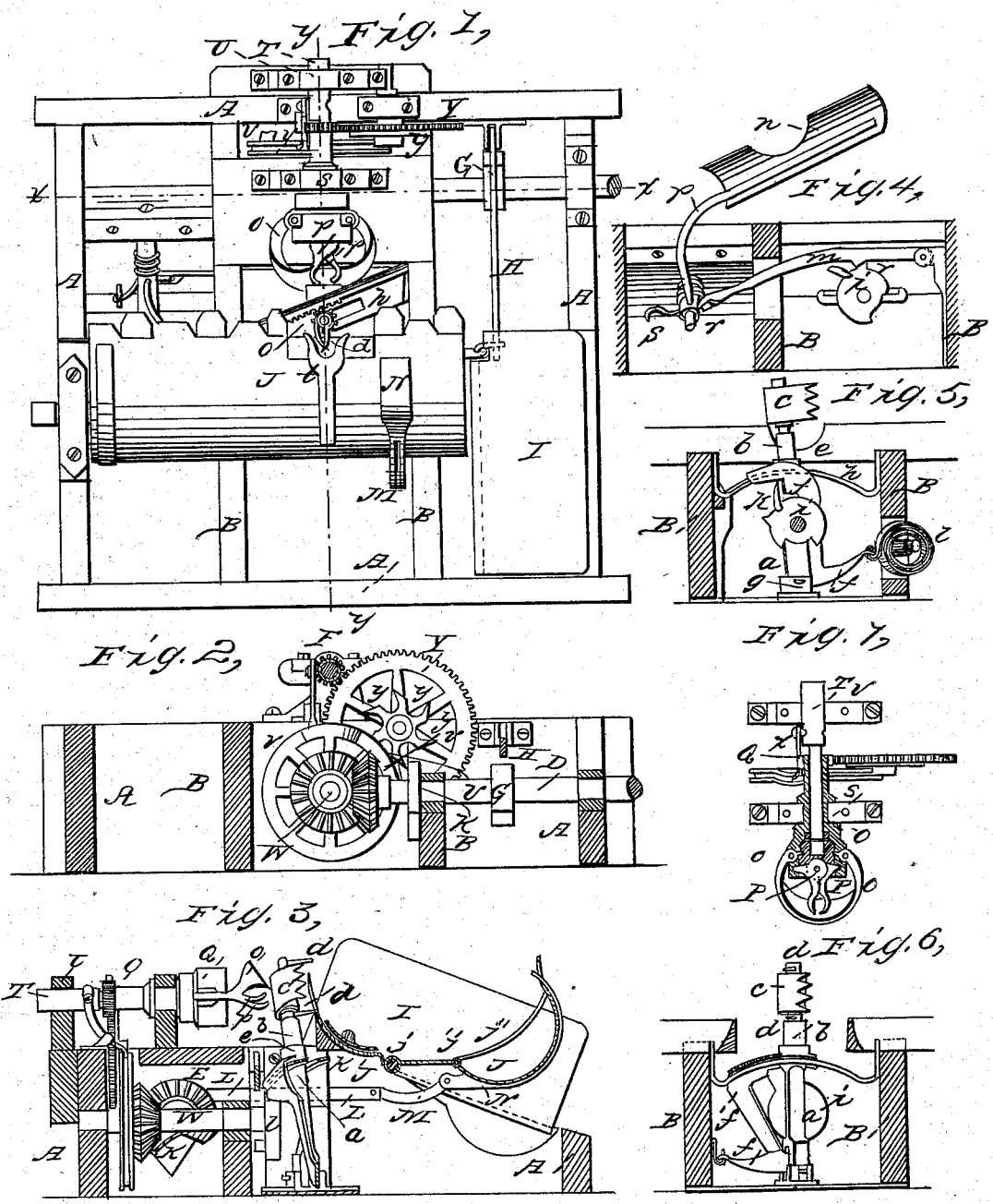

ROBERT D. BROWN, OF COVINGTON, INDIANA.

IMPROVEMENT IN BINDING ATTACHMENTS TO HARVESTERS.

Specification forming part of Letters Patent No. 48,363, dated June 27, 1865.

*To all whom it may concern:*

Be it known that I, R. D. BROWN, of Covington, in the county of Fountain and State of Indiana, have invented a new and useful Improvement in Automatic Grain-Binders for Harvesters; and I do hereby declare the following to be a full and exact description of the same, reference being had to the accompanying drawings, making part of this specification, in which—

Figure 1 is a plan view. Fig. 2 is a vertical section on the line $x\ x$. Fig. 3 is a vertical section through the frame on the line $y\ y$, the working part displayed by the section being shown in relief or elevation. Fig. 4 is a partial vertical section, showing in elevation the sheaf-discharger and the method of operating it. Fig. 5 is a partial vertical section, showing the tucking-hand and holder in elevation after they have made their advance against the band, and just as the tucking-hand is about to rotate on the shaft or post to tuck the twist under the band. Fig. 6 is a partial vertical section, showing the holder and tucker in elevation on the reverse side from that exhibited in Fig. 5. Fig. 7 is a plan of the griping and twisting jaws and fingers, showing the method of operating them.

Similar letters of reference indicate corresponding parts in the several figures.

The motions of this machine are all derived from the revolutions of one shaft, and it is adapted automatically to perform the full series of operations from receiving the gavel which is raked off the platform to the discharge of the bound sheaf.

A sketch will be given of the series of motions in their due order of time, which will be followed by a detailed description of the construction, and it may as well be understood at once that the cutting and raking arrangements, forming no part of this invention, are neither shown nor described, nor is the machine shown as mounted on wheels, as the method of deriving the motions from the prime motor is not necessary to a clear understanding of my invention, nor does it fall within the range of what I shall specify as of my origination.

The position of the frame in and on which my binder is operated will be such relatively to the raking mechanism that the cradle will be at the end of the rake-stroke ready to receive the gavel of grain as it is swept from the platform. I prefer a rake which traverses the platform parallel with the cutter-bar; but if a sweep-rake be employed which describes an arc of ninety degrees or a full circle, the frame containing the binder will have such a relative position as to present the cradle to catch the grain when the rake leaves it.

A band of straw being laid across the cradle from the fork $t$ on the cradle to the griping-fingers, the grain is deposited by the rake within it, the butting-board rising and flattening the butt of the sheaf by drawing in the straggling straws which project beyond the general mass of their fellows. As the butting-board falls back the movable hinged side of the cradle rises and laps the gavel against the stationary side of the cradle, and carries the upper end of the band within the range of the griping-jaws, which close upon it, while the lower end of the band is seized by the griping-fingers. The griping-jaws then make one revolution around the fingers, thereby wrapping one end of the band around the other, when the tucking-hand and holder move from their position behind the cradle, advancing in an oblique line from the butt and against the sheaf, the holding-fingers protruding into the sheaf, and there maintaining their position, while the tucking-hand, which is attached to a sleeve on the holder-shaft, rotates on the latter, pushes the twisted ends under the band, and then retracing its circular track is withdrawn, together with the holder, by a spring. The sheaf is now freed by the opening of the cradle, and the discharger rising, upsets the sheaf, butt over top, over the side, or rather the end of the machine.

The binding mechanism is supported and arranged in a rectangular frame, A A, with suitable cross-pieces B B and C C, which support the various journal-bearings of the moving parts. The motions are derived from a prime motor, which may be the driving-wheels of the harvesting-machine of which this binder forms a part, but I commence to consider it with the shaft D, which passes through and is supported in journal-bearings in the frame-pieces A B, and has at its inner end a bevel cog-wheel, E, which gears into a similar wheel, F, supported in bearings in the frame-pieces A C, on a shaft at right angles to the shaft D.

On the shaft D is a cam, G, the tooth of which, at a suitable period of the revolution of the said shaft, comes in contact with the pivoted lever H, and causes it to rise, and, by its connection with the hinged butting-board I, to raise that to an elevated position describing an arc of ninety degrees, and coming in contact with the end of the sheet-metal trough J, which forms the cradle. The cradle J consists of two parts. One is stationary, and is represented at J', and is curved to correspond with the form of a sheaf. The other, J, is doubly hinged at $j$ to a bar which passes across the machine from A to B, having bearings thereon and at $j'$ to admit of the movable section lying more flatly or wider open for the reception of the gavel. The movable section is raised by the pressure of the cam K of the shaft D upon the end of the sliding rod L, which is jointed by a link, M, to the strap N, on the under side of the upper section of the cradle J. The cam K, after it has projected the sliding rod in such a way as to close up the cradle around the sheaf, retains it in that condition by the continued impingement of its outer curved surface against the end of the rod L. At a suitable time the rod is released by reason of the change in the periphery of the cam, and, the cradle being abandoned to the influence of the straightening-spring $j''$, flies back and retracts the rod L to its former position. A spring attaching the rod I to the frame-piece C may be placed to assist in the retraction of the said rod.

Next in order of time it becomes necessary to explain the construction of the griping-jaws, which have two motions, one intermittent reciprocatory and longitudinal to alternately grip and release, and the other intermittent and rotary to twist at the proper intervals of time. The pairs of griping-jaws O O, and griping-fingers P P, (see Fig. 7,) are attached to a sleeve, Q, and a head, R, respectively. This sleeve is restrained from longitudinal motion by the boxing S, in which it rotates, but the mandrel T, which occupies an axial position in the sleeve Q, has a reciprocating longitudinal motion, but no rotation, as it is restrained by the shape of its square shaft which slides in the bearing U. As has been said, the griping-jaws O O are pivoted in the sleeve Q, and a toe projects into an annular groove in the head R, on the end of the mandrel T, while the griping-fingers P P are pivoted in the head R, and have toes which project into annular slots in the sleeve Q. The longitudinal motion of the mandrel T is effected by the wheel V, which has a cam-groove in its periphery, is attached to the shaft W, and is driven by the bevel-gearing E F. A vibrating lever, $x$, pivoted to a lug on the frame A, is attached at its upper end by a pin to the mandrel T, and at its lower end engages with the groove in the cam-wheel V, so as whenever the said groove leaves its plane of rotation the lever is vibrated and communicates a longitudinal motion to the mandrel T, which, by the rigidity in that direction of the sleeve Q, has the effect of expanding and closing the pairs of jaws O O and fingers P P. The revolution of the griping-jaws, which are attached to the sleeve around the griping-fingers which are pivoted to the head of the mandrel, is effected by means of the engagement of the pinion Q' on the sleeve with the spur-wheel Y. The volution of the wheel Y, as that also of the sleeve-wheel Q', is intermittent, and is produced by a pin, $v$, on the face of the wheel V, which engages in the teeth $y$ of the wheel Y, of which teeth $y$ there are six, and of such shape and relation to the motion of the pin that one revolution of the wheel V rotates the wheel Y one-sixth of a revolution, and the latter, owing to its larger comparative size, rotates the sleeve Q and the griping-jaws O O one full revolution for a sixth of a revolution of the wheel Y, and for a full revolution of the wheel V; but while a revolution of V gives a revolution of Q, the latter is only in motion one-sixth of its time, but then moves at a speed six times as great as that of V. This intermittent motion is necessitated by the nature of the labor to be performed.

This completes the description in the order of time to the point where the ends of the straw band are twisted, and I now proceed to describe the tucking arrangement for securing the twist under the band.

The vibrating post or holder $a$ is pivoted at its lower end to a lug, $g$, on the frame, and is moved in the oblique guides $h$ by means of the projection $k$, which protrudes from the periphery of the cam $i$, and also from the face of it. As the cam revolves it pushes the post before it in the guides, the post gradually leaning away from the plane of rotation of the cam, owing to the obliquity of the guides, and by the time the post has arrived at the end of the slot in which it traverses, the projection on the cam leaves the post and bears against the Z-shaped piece $f$, which is also pivoted to the lug $g$, and causes the said piece $f$ to traverse still further in the same plane as that in which it had been traveling with the post $a$. On the upper end of the post $a$ is a sleeve, $b$, with a scroll-shaped piece, $c$, with fingers, which I call a tucking-hand, as that fairly describes its shape, resembling the hand partly bent, and also the motion, which is that of pushing or tucking the twist under the band. On this sleeve is a pinion, $e$, which is engaged by the teeth of the rack $f$. And now resuming where we left the post $a$ at the end of its slot, and the projection $k$ of the cam $i$ passed from the post $a$ to the piece $f$, we shall find that the motion of the piece $f$ will have the effect of rotating the pinion $e$, and cause the tucking-hand to revolve, fingers first, around the post $a$, on which latter two pins $d\ d$ are placed, which by the described oblique motion of the post in its guides are thrust into the sheaf and hold the band rigidly while the tuck is being made. As soon as the projection $k$, in its continued revolution, has passed from contact with the piece $f$, the spring $l$ forcibly raises the foot of the piece $f$, throwing it back against the post, retracting the tucking-hand by the counter-revolution of the pinion $e$, and by its impetus and sustained pressure throwing back the post to its normal position in the rear of the stationary portion of the cradle J.

This brings us to the point described above, where the continued revolution of the cam K releases the sliding rod L, and abandons the jointed section J of the cradle to the influence of the straightening-spring $j^2$.

One object attained by this spring or springs, for there may be several if required, is to vary the capacity of the cradle as it will press with sufficient force against the gavel to reduce it to the required solidity, but will bend until it touches the side of the cradle when the amount of straw in the gavel requires the full capacity of the cradle.

One more motion remains to be described, which is that of the sheaf-discharger, which removes the sheaf from the cradle. It consists of a bent plate, $n$, on the end of an arm, $p$, attached to a rock-shaft, $q$, the latter having a pin, $r$, resting upon the end of a pivoted lever, $m$. The cam $i$ on the shaft W, before described, besides carrying the projection that operates the post and rack of the tucker and holder, has a pin, $r'$, which operates on the under side of the lever $m$ to throw up the plate $n$, and immediately allow it to subside under the influence of the spring $s$.

Having thus fully described the nature, construction, and operation of my invention, what I claim therein as new, and desire to secure by Letters Patent, is—

1. The butting-board I, operated as described, for butting up that end of the sheaf.

2. The cradle constructed and operated as described, that is to say, consisting of the stationary part J and the doubly-hinged movable part J', which is raised by means of the cam K and jointed slide L M N, substantially as described.

3. The arrangement of the spring or springs $j''$ on the inside of the cradle, for the purpose of adjusting its capacity to varying sizes of gavels when said spring is employed for opening the said cradle, substantially as described.

4. The combination of the non-rotating griping-fingers P P, and the rotating griping-jaws O O, whereby one end of the band is twisted around the other, in the manner described.

5. The combination of the sliding mandrel $t$ and head R with the rotating sleeve Q, furnished, respectively, with the toed griping-fingers P P and griping-jaws O O, which, by the protrusion or withdrawal of the mandrel, are caused to open and shut, in the manner described.

6. The method described of producing the intermittent revolution of the sleeve, that is to say, the combination of the wheel V with its pin $v$, and the wheel Y with its teeth $y$, and the sleeve-pinion Q', which secures one complete revolution of the sleeve $s$ to a revolution of the wheel V, but periodically, and then at a speed commensurate with the delay due to its intermittent functions.

7. The combination of the pivoted post $a$, carrying the pins $d$ $d$, or analogous holding devices, with the pinion-sleeve $e$ $b$, carrying a tucking-hand, $c$, so that after advancing to the point where the tuck is to be made, the said sleeve shall be rotated by a rack or other device which is brought to engage therewith, and the hand caused to push the twist or knot under the band.

8. Pushing the knot under the band by means of a device which is independent of the sheaf holding and twisting devices, and which is advanced for that purpose, in connection with a holder, without rotating until it reaches the desired point, when it is caused to rotate to push the knot under the band, while the latter is restrained by the holder from lateral displacement.

ROBT. D. BROWN.

Witnesses:
EDWARD H. KNIGHT,
ALEX. A. C. KLAUCKE.